United States Patent
Yuki et al.

(10) Patent No.: US 12,234,354 B2
(45) Date of Patent: Feb. 25, 2025

(54) VISCOSITY INDEX IMPROVERS

(71) Applicant: Evonik Operations GmbH, Essen (DE)

(72) Inventors: Tsuyoshi Yuki, Otsu (JP); Tomohiro Matsuda, Tokyo (JP); Boris Eisenberg, Heppenheim (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/814,663

(22) Filed: Mar. 10, 2020

(65) Prior Publication Data

US 2020/0291218 A1 Sep. 17, 2020

(30) Foreign Application Priority Data

Mar. 11, 2019 (EP) .................................... 19161800

(51) Int. Cl.
| | |
|---|---|
| C10M 145/14 | (2006.01) |
| C08L 33/08 | (2006.01) |
| C08L 33/10 | (2006.01) |
| C10M 169/04 | (2006.01) |
| C10N 20/00 | (2006.01) |
| C10N 20/04 | (2006.01) |
| C10N 30/02 | (2006.01) |
| C10N 40/25 | (2006.01) |

(52) U.S. Cl.
CPC .............. *C08L 33/08* (2013.01); *C08L 33/10* (2013.01); *C10M 145/14* (2013.01); *C10M 169/041* (2013.01); *C10N 2020/04* (2013.01); *C10N 2020/069* (2020.05); *C10N 2020/071* (2020.05); *C10N 2030/02* (2013.01); *C10N 2040/25* (2013.01)

(58) Field of Classification Search
CPC ....... C08L 33/08; C08L 33/10; C10M 145/14; C10M 169/041; C10M 2209/084; C10M 165/00; C10M 169/047; C10N 2020/071; C10N 2020/069; C10N 2020/04; C10N 2030/02; C10N 2040/25; C10N 2020/02; C10N 2030/68; C08F 220/18
See application file for complete search history.

(56) References Cited

U.S. PATENT DOCUMENTS

| | | | |
|---|---|---|---|
| 3,772,196 | A | 11/1973 | St. Clair et al. |
| 4,116,917 | A | 9/1978 | Eckert |
| 4,788,316 | A | 11/1988 | Thornthwaite et al. |
| 5,834,408 | A | 11/1998 | Mishra et al. |
| 6,599,864 | B1 | 7/2003 | Bertomeu |
| 6,746,993 | B2 * | 6/2004 | Yuki ............... C10M 145/14 508/469 |
| 8,163,683 | B2 | 4/2012 | Haga et al. |
| 2011/0237477 | A1 | 9/2011 | Tagawa et al. |
| 2019/0016987 | A1 | 1/2019 | Csihony et al. |

FOREIGN PATENT DOCUMENTS

| | | |
|---|---|---|
| DE | 15 20 696 | 4/1969 |
| EP | 0 668 342 | 8/1995 |
| EP | 0 776 959 | 6/1997 |
| EP | 1 029 029 | 8/2000 |
| GB | 1068283 | 5/1967 |
| JP | 2008-88215 | 4/2008 |
| RU | 2576401 | 3/2016 |
| RU | 2656213 | 6/2018 |
| WO | 96/30421 | 10/1996 |
| WO | 97/18247 | 5/1997 |
| WO | 97/21788 | 6/1997 |
| WO | 97/47661 | 12/1997 |
| WO | 98/01478 | 1/1998 |
| WO | 98/40415 | 9/1998 |
| WO | 99/10387 | 3/1999 |
| WO | 99/20720 | 4/1999 |
| WO | 99/41332 | 8/1999 |
| WO | 00/08115 | 2/2000 |
| WO | 00/14179 | 3/2000 |
| WO | 00/14183 | 3/2000 |
| WO | 00/14187 | 3/2000 |
| WO | 00/14188 | 3/2000 |
| WO | 00/15736 | 3/2000 |
| WO | 01/18156 | 3/2001 |
| WO | 01/57166 | 8/2001 |
| WO | 2004/083169 | 9/2004 |
| WO | 2006/007934 | 1/2006 |
| WO | 2013/189951 | 12/2013 |

OTHER PUBLICATIONS

Extended Search Report issued Aug. 26, 2019 in European Application No. 19161800.8, 8 pages.
Database WPI, Week 200837, 2008, Thomson Scientific, London, GB; AN 2008-F67842, XP002793491 & JP 2008 (Apr. 17, 2008), paragraph [40]-[60]; examples A5, H2; tables 4,5; See item A14- JP2008-88215.
Anisimov I. G. et al. Topliva, smazočnye materialy, tehničeskie židkosti. Assortiment I primenenie [Fuels, lubricants, technical liquids. Range and application], Textbook (Škol'nikov V. M., Ed.), 2nd ed. Moscow, Tehinform, 1999, 596 pages, pp. 422-424, 427.
Russian Office Action dated Nov. 30, 2022, in Russian Patent Application No. 2020109781, with partial English translation, 18 pages.
Sutâgin V. M., Bondaletova L. I. Himiâ i fizika polimerov [Polymer Chemistry and Physics], Textbook. Tomsk, TPU, 2003, 208 pages, pp. 132, 140-142, 150-151, 173.
Syrbakov A. P., Korčuganova M. A. (Ed.) Toplivo i smazočnye materialy [Fuel and Lubricants], Textbook of Tomsk Polytechnic University, 2015, p. 56 & 65.

* cited by examiner

*Primary Examiner* — Taiwo Oladapo
(74) *Attorney, Agent, or Firm* — Grüneberg and Myers PLLC

(57) ABSTRACT

Polyalkyl(meth)acrylate based polymers which include straight chained $C_{18-24}$ alkyl(meth)acrylates and have an average carbon number of 7.0 to 7.5 and a weight-average molecular weight of 300,000 g/mol or greater are a useful component for a lubricant composition. Furthermore, lubricant compositions containing such polymers show improved high temperature-high shear performance, especially in engine oil (EO) compositions.

6 Claims, No Drawings

VISCOSITY INDEX IMPROVERS

CROSS-REFERENCE TO RELATED APPLICATION

The present application claims the benefit to European application EP 19161800, filed on to Mar. 11, 2019, which is incorporated by reference in its entirety.

BACKGROUND OF THE INVENTION

Field of the Invention

The present invention is directed to polyalkyl(meth)acrylate based polymers comprising straight chained $C_{18-24}$ alkyl(meth)acrylates and having an average carbon number of 7.0 to 7.5 and weight-average molecular weights of 300,000 g/mol or greater, their preparation, lubricant compositions comprising such polymers and their use to improve the high temperature-high shear performance of lubricant compositions, especially of engine oil (EO) compositions.

Discussion of the Background

Formulations of motor oils are generally defined by the SAE J300 standard (SAE=Society of Automotive Engineers). This standard classifies motor oils into the SAE viscosity grades xW-y where x=0, 5, 10, 15, 20, 35 and y=8, 12, 16, 20, 30, 40, 50, 60. This is done e.g. via the kinematic viscosity KV and the high-temperature high-shear viscosity HTHS, which parameters are important for engine protection.

Lubricant properties are typically improved by the addition of additives to lubricating oils. Viscosity index (VI) improvers are generally added to a lubricant to improve its thickening efficiency and to protect the engine.

The thickening efficiency of a VI improver is specified by its $KV_{100}$ (kinematic viscosity at 100° C.) at a given treat rate. A higher $KV_{100}$ at the same treat rate is considered to be beneficial for performance criteria and net treat cost. It is well known in the art that with an increase of the thickening efficiency also the high-temperature high-shear stability $HTHS_{100}$ is raising what means that a careful balance is needed in the development of new VI improvers.

Moreover, the thickening efficiency at a given $HTHS_{150}$ should be increased to reduce the treat rate of a VI improver. If the thickening efficiency of a VI improver is high, then the treat rate is low; i.e. less polymer is needed to reach the targeted $HTHS_{150}$ value.

This leads to the following assumptions for an optimum VI improver: It should provide high thickening efficiency at given $HTHS_{150}$ conditions in order to keep the treat rate low, minimum $KV_{40}$ and $HTHS_{100}$ in order to achieve the best fuel economy results whereby the $KV_{100}$ should be well above the value as required by the J300 specifications.

Typically, when VI improvers for excellent fuel economy performance are developed, the $HTHS_{100}$ value is minimized, e.g. in a 0W20 formulation at a given $HTHS_{150}$ of 2.6 mPa*s. A typical effect which can be seen in this case is a parallel lowering of the $KV_{100}$ values because the thickening at 100° C. is reduced in a parallel fashion to the lowering of the high temperature high shear (HTHS) thickening at 100° C.

There is still further need to improve the $KV_{100}$, $HTHS_{100}$ and $HTHS_{150}$ performance of a VI improver even more to fulfill stronger formulation criteria for lubricating oil compositions and especially engine oil formulations.

For example, according to SAE J300, the $KV_{100}$ for a 0W20 engine oil formulation should be at least 6.9 mm²/s at a given $HTHS_{150}$ of 2.6 mPa*s for sufficient engine protection. That means that the $HTHS_{100}$ and $KV_{40}$ should be minimized for optimum fuel economy while the $KV_{100}$ should be kept at >6.9 cSt.

Additionally, according to SAE J300, the low temperature pumping viscosity (MRV) for 0W20 engine oil should be max. 60,000 mPa*s with no yield stress at −40° C.

Polyalkyl (meth)acrylate based polymers are well known in the art to be efficient VI improvers.

U.S. Pat. No. 5,834,408 discloses polyalkyl methacrylate based polymers comprising methyl methacrylate, lauryl methacrylate and stearyl methacrylate having a polydispersity index of 1.0 to 2.0, preferably 1.0 to 1.5. Such polymers find their primary utility as pour point depressants in lubricating oil compositions. However, details regarding the performance of such polymers in engine oil formulations and their effects on KV40, KV100 and HTHS100 are not given.

U.S. Pat. No. 6,746,993 discloses polyalkyl methacrylate based polymers comprising certain alkyl methacrylates within specific ranges. The weight-average molecular weight may generally be in the range of 5,000 to 2,000,000 g/mol, but working examples are only within the narrow range of 20.000 to 60,000 g/mol. However, details regarding the performance of such polymers in engine oil formulations and their effects on KV40, KV100 and HTHS100 are not given.

SUMMARY OF THE INVENTION

It was now surprisingly found that polyalkyl(meth)acrylate based copolymers comprising straight chained $C_{18-24}$ alkyl(meth)acrylates and having a weight-average molecular weight $M_w$ of at least 300,000 g/mol and an average carbon number of 7.0 to 7.5 show improved performance profiles as viscosity index improvers in lubricating oil compositions, especially in engine oil formulations.

The object underlying the invention is achieved by the subject matter of the following embodiments.

1. Polyalkyl(meth)acrylate based copolymers comprising 7% to 15% by weight of straight chained $C_{18-24}$ alkyl(meth) acrylates, characterized by an average carbon number of 7.0 to 7.5 and a weight-average molecular weight $M_w$ of 300,000 g/mol or greater, wherein the average carbon number corresponds to the molar average of all carbon atoms present in the alkyl residues of the alkyl (meth)acrylates forming the polyalkyl (meth)acrylate based copolymer and the weight-average molecular weight $M_w$ was determined by gel permeation chromatography (GPC) using a polymethylmethacrylate calibration.

2. Polyalkyl(meth)acrylate based copolymers according to embodiment 1, comprising 10% to 14% by weight of straight chained $C_{18-24}$ alkyl(meth)acrylates.

3. Polyalkyl (meth)acrylate based copolymers according to embodiment 1, comprising:
   (a) 20 to 35% by weight of straight chained or branched $C_{1-4}$-alkyl (meth)acrylates;
   (b) 50 to 65% by weight of straight chained or branched $C_{10-16}$-alkyl (meth)acrylates; and
   (c) 7 to 15% by weight of straight chained $C_{18-24}$-alkyl (meth)acrylates.

4. Polyalkyl (meth)acrylate based copolymers according to embodiment 2, comprising:
   (a) 20 to 35% by weight of straight chained or branched $C_{1-4}$-alkyl (meth)acrylates;

(b) 50 to 65% by weight of straight chained or branched $C_{10\text{-}16}$-alkyl (meth)acrylates; and
(c) 10 to 14% by weight of straight chained $C_{18\text{-}24}$-alkyl (meth)acrylates.

5. Polyalkyl (meth)acrylate based copolymers according to embodiment 1, 2, 3 or 4, having a weight-average molecular weight $M_w$ in the range of 300,000 g/mol to 1,000,000 g/mol.

6. Polyalkyl (meth)acrylate based copolymers according to embodiment 1, 2, 3 or 4, having a number-average molecular weight $M_n$ in the range of 100,000 g/mol to 300,000 g/mol.

7. Polyalkyl (meth)acrylate based copolymers according to embodiment 1, 2, 3 or 4, having a number-average molecular weight $M_n$ in the range of 100,000 g/mol to 200,000 g/mol.

8. Additive composition, comprising:
(A) 60 to 80% by weight of a base oil; and
(B) 20 to 40% by weight of a polyalkyl (meth)acrylate based copolymer comprising 7% to 15% by weight of straight chained $C_{18\text{-}24}$ alkyl(meth)acrylates, characterized by an average carbon number of 7.0 to 7.5 and a weight-average molecular weight $M_w$ of 300,000 g/mol or greater, wherein the average carbon number corresponds to the molar average of all carbon atoms present in the alkyl residues of the alkyl (meth)acrylates forming the polyalkyl (meth)acrylate based copolymer and the weight-average molecular weight $M_w$ was determined by gel permeation chromatography (GPC) using a polymethylmethacrylate calibration.

9. Additive composition according to embodiment 8 further comprising:
(C) 0 to 3% by weight of a polyalkyl (meth)acrylate based copolymer, characterized by an average carbon number of 12.0 to 13.0 and a weight-average molecular weight $M_w$ of 10,000 to 100,000 g/mol,
based on the total weight of the additive composition.

10. Additive composition according to embodiment 8 or 9, characterized in that the base oil (A) is selected from the group consisting of API Group I, II, III, IV and V oil and mixtures thereof.

11. Additive composition according to embodiment 8, 9 or 10, characterized in that the base oil (A) has a $KV_{100}$ of 3 to 5 mm²/s, determined to ASTM D445.

12. Additive composition according to embodiment 8, 9, 10 or 11, characterized in that the polyalkyl (meth)acrylate based copolymer (B) comprises:
(a) 20 to 35% by weight of straight chained or branched $C_{1\text{-}4}$-alkyl (meth)acrylates;
(b) 50 to 65% by weight of straight chained or branched $C_{10\text{-}16}$-alkyl (meth)acrylates; and
(c) 7 to 15% by weight of straight chained $C_{18\text{-}24}$-alkyl (meth)acrylates.

13. Additive composition according to embodiment 8, 9, 10, 11 or 12, characterized in that the polyalkyl(meth) acrylate based copolymer of component (C) does further comprise:
(a) 88 to 98% by weight of straight chained or branched $C_{10\text{-}16}$-alkyl (meth)acrylates;
(b) 2 to 6% by weight of straight chained $C_{18\text{-}24}$-alkyl (meth)acrylates; and
(c) 0 to 10% by weight of straight chained or branched $C_{1\text{-}4}$-alkyl (meth)acrylates.

14. Method of keeping the $KV_{100}$ at a given $HTHS_{150}$ and in parallel decreasing the $HTHS_{100}$ of lubricating oil compositions, especially of engine oil formulations, the method comprising the steps of:
(a) adding an additive composition according to any one of embodiment 8-13 to a lubricating oil composition; and
(b) keeping $KV_{100}$ and in parallel decreasing $HTHS_{100}$ of said lubricating oil composition.

15. Lubricating oil composition, comprising:
(A) 81.4% to 98.97% by weight of a base oil;
(B) 1 to 3% by weight of a polyalkyl (meth)acrylate based copolymer comprising 7% to 15% by weight of straight chained $C_{18\text{-}24}$ alkyl(meth)acrylates, characterized by an average carbon number of 7.0 to 7.5 and a weight-average molecular weight $M_w$ of 300,000 g/mol or greater;
(C) 0.03 to 0.6% by weight of a polyalkyl (meth)acrylate based copolymer, characterized by an average carbon number of 12.0 to 13.0 and a weight-average molecular weight $M_w$ of 10,000 to 100,000 g/mol; and
(D) 0 to 15% by weight of one or more further additives,
based on the total weight of the lubricating oil composition, wherein the average carbon number corresponds to the molar average of all carbon atoms present in the alkyl residues of the alkyl (meth)acrylates forming the polyalkyl (meth)acrylate based copolymer and the weight-average molecular weight $M_w$ was determined by gel permeation chromatography (GPC) using a polymethylmethacrylate calibration.

16. Lubricating oil composition according to embodiment 15, characterized in that the polyalkyl (meth)acrylate based copolymer (B) comprises:
(a) 20 to 35% by weight of straight chained or branched $C_{1\text{-}4}$-alkyl (meth)acrylates;
(b) 50 to 65% by weight of straight chained or branched $C_{10\text{-}16}$-alkyl (meth)acrylates; and
(c) 7 to 15% by weight of straight chained $C_{18\text{-}24}$-alkyl (meth)acrylates.

17. The lubricating oil composition according to embodiment 15 or 16, characterized in that component (D) is selected from the group consisting of conventional VI improvers, dispersants, defoamers, detergents, antioxidants, pour point depressants, antiwear additives, extreme pressure additives, friction modifiers, anticorrosion additives, dyes and mixtures thereof.

DETAILED DESCRIPTION OF THE INVENTION

A first object of the present invention is directed to polyalkyl(meth)acrylate based copolymers comprising straight chained $C_{18\text{-}24}$ alkyl(meth)acrylates and, which are characterized by an average carbon number of 7.0 to 7.5 and a weight-average molecular weight $M_w$ of 300,000 g/mol or greater.

The average carbon number corresponds to the molar average of all carbon atoms present in the alkyl residue of each alkyl (meth)acrylate forming the polyalkyl (meth) acrylate based copolymer and was calculated based on the total composition of the polyalkyl (meth)acrylate based copolymer, i.e. by calculating the molar average of all carbon atoms present in the alkyl residues of the alkyl (meth)acrylates.

The weight-average molecular weight of the polyalkyl (meth)acrylate based polymers according to the present invention is preferably in the range of 300.000 to 2,000,000 g/mol, more preferably in the range of 300,000 to 1,000,000 g/mol and especially preferred in the range of 500,000 to 1,000,000 g/mol. The number-average molecular weight of the polyalkyl(meth)acrylate based polymers according to the present invention is preferably in the range of 100,000 to 300,000 g/mol, more preferably in the range of 100,000 to 200,000 g/mol and especially preferred in the range of 110,000 to 150,000 g/mol.

Preferably, the polyalkyl (meth)acrylate based polymers according to the present invention have a polydispersity index (D) $M_w/M_n$ in the range of 2 to 8, more preferably in the range of 3 to 7.

$M_w$ and $M_n$ are determined by size exclusion chromatography (SEC) using commercially available polymethylmethacrylate standards. The determination is effected by gel permeation chromatography (GPC) with RI (refractive index) detector in tetrahydrofuran at 40° C. using a polymethyl methacrylate (PMMA) calibration.

A preferred first object of the present invention is directed to polyalkyl (meth)acrylate based copolymers as mentioned further above, comprising:
 (a) 20 to 35% by weight of straight chained or branched $C_{1-4}$-alkyl (meth)acrylates;
 (b) 50 to 65% by weight of straight chained or branched $C_{10-16}$-alkyl (meth)acrylates; and
 (c) 7 to 15% by weight of straight chained $C_{18-24}$-alkyl (meth)acrylates.

The content of each component (a), (b) and (c) is based on the total composition of the polyalkyl(meth)acrylate based polymer.

In a particular embodiment, the proportions of components (a) and (b) add up to 100% by weight.

The term "(meth)acrylates" refers to both, esters of acrylic acid and esters of methacrylic acid. Esters of methacrylic esters are preferred.

The $C_{1-4}$-alkyl (meth)acrylates for use in accordance with the invention are esters of (meth)acrylic acid and straight chained or branched alcohols having 1 to 4 carbon atoms.

The term "$C_{1-4}$-alkyl (meth)acrylates" encompasses individual (meth)acrylic esters with an alcohol of a particular length, and likewise mixtures of (meth)acrylic esters with alcohols of different lengths.

Suitable $C_{1-4}$-alkyl (meth)acrylates include, for example, methyl (meth)acrylate, ethyl (meth)acrylate, n-propyl (meth)acrylate), iso-propyl (meth)acrylate, n-butyl (meth) acrylate, iso-butyl (meth)acrylate and tert-butyl (meth)acrylate. Particularly preferred $C_{1-4}$-alkyl (meth)acrylates are methyl (meth)acrylate and n-butyl (meth)acrylate; methyl methacrylate and n-butyl methacrylate are especially preferred.

The $C_{10-16}$-alkyl (meth)acrylates for use in accordance with the invention are esters of (meth)acrylic acid and straight chain or branched alcohols having 10 to 16 carbon atoms.

The term "$C_{10-16}$-alkyl (meth)acrylates" encompasses individual (meth)acrylic esters with an alcohol of a particular length, and likewise mixtures of methacrylic esters with alcohols of different lengths.

Suitable $C_{10-16}$-alkyl (meth)acrylates include, for example, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate and hexadecyl (meth)acrylate.

Amongst these, particularly preferred are methacrylic esters of a linear $C_{12-14}$-alcohol mixture ($C_{12-14}$-alkyl-methacrylate).

The $C_{18-24}$ alkyl (meth)acrylates for use in accordance with the invention are esters of (meth)acrylic acid and straight chained alcohols having 18 to 24 carbon atoms. The term "$C_{18-24}$ alkyl (meth)acrylates" encompasses individual (meth)acrylic esters with an alcohol of a particular length, and likewise mixtures of (meth)acrylic esters with alcohols of different lengths.

Suitable straight chained $C_{18-24}$ alkyl (meth)acrylates include, for example, octadecyl (meth)acrylate, nonadecyl (meth)acrylate, eicosyl (meth)acrylate, docosyl (meth)acrylate and mixtures thereof.

Amongst these, the particularly preferred methacrylic ester is that of linear $C_{18}$ alcohol.

A further preferred first object of the present invention is directed to polyalkyl (meth)acrylate based copolymers as mentioned further above, comprising:
 (a) 20 to 35% by weight of straight chained or branched $C_{1-4}$-alkyl (meth)acrylates;
 (b) 50 to 65% by weight of straight chained or branched $C_{10-16}$-alkyl (meth)acrylates; and
 (c) 10 to 14% by weight of straight chained $C_{18-24}$-alkyl (meth)acrylates.

The content of each component (a), (b) and (c) is based on the total composition of the polyalkyl(meth)acrylate based polymer.

In a particular embodiment, the proportions of components (a), (b) and (c) add up to 100% by weight.

The polymers according to the present invention are characterized by their contribution to low $KV_{40}$ and $HTHS_{100}$ values (e.g. at a given $HTHS_{150}$ of 2.6 mPas) of lubricating oil compositions comprising them.

The polyalkyl(meth)acrylate based copolymers according to the present invention can therefore be used in all common grades of motor oils having the viscosity characteristics defined in the document SAE J300.

A further object of the present invention is therefore directed to the use of polyalkyl(meth)acrylate based copolymers according to the present invention to improve the kinematic viscosity and HTHS performance of lubricating oil compositions, especially of engine oil formulations.

A further object of the present invention is directed to a method of improving the kinematic viscosity and HTHS performance of lubricating oil compositions, especially of engine oil formulations, by adding polyalkyl(meth)acrylate based polymers according to the present invention.

A further object of the present invention is directed to the use of polyalkyl(meth)acrylate based polymers according to the present invention to keep $KV_{100}$ at a given $HTHS_{150}$ and in parallel decrease $HTHS_{100}$ of lubricating oil compositions, especially of engine oil formulations (when formulated to a defined $HTHS_{150}$, e.g. for $HTHS_{150}$ of 2.6 mPas for a 0W20 formulation).

A further object of the present invention is directed to a method of keeping $KV_{100}$ at a given $HTHS_{150}$ and in parallel decreasing $HTHS_{100}$ of lubricating oil compositions, especially of engine oil formulations (when formulated to a defined $HTHS_{150}$, e.g. for $HTHS_{150}$ of 2.6 mPas for a 0W20 formulation), by adding a polyalkyl(meth)acrylate based polymers according to the present invention.

A second object of the present invention is directed to an additive composition, comprising:
 (A) 60 to 80% by weight of a base oil; and
 (B) 20 to 40% by weight of a polyalkyl (meth)acrylate based copolymer comprising straight chained $C_{18-24}$ alkyl(meth)acrylates, characterized by an average carbon number of 7.0 to 7.5 and a weight-average molecular weight $M_w$ of 300,000 g/mol or greater.

The content of each component (A) and (B) is based on the total weight of the additive composition.

In a particular embodiment, the proportions of components (A) and (B) add up to 100% by weight.

The base oil to be used in the additive composition comprises an oil of lubricating viscosity. Such oils include natural and synthetic oils, oil derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and Ill are mineral oils which are classified by the amount of saturates and sulphur they contain and by their viscosity indices; Group IV are polyalphaolefins; and Group V are all others, including e.g. ester oils. The table below illustrates these API classifications.

| Group | Saturates | Sulphur content | Viscosity Index |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. ($KV_{100}$) of appropriate apolar base oils used to prepare an additive composition or lubricating composition in accordance with the present invention is preferably in the range of 2 mm$^2$/s to 10 mm$^2$/s, more preferably in the range of 3 mm$^2$/s to 5 mm$^2$/s, according to ASTM D445.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342. WO 97/21788, WO 00/15736, WO 00/14188, WO 00/14187, WO 00/14183, WO 00/14179, WO 00/08115, WO 99/41332, EP 1 029 029, WO 01/18156. WO 01/57166 and WO 2013/189951.

Especially for engine oil formulations are used base oils of API Group 11 or III or mixtures thereof.

The additive composition of the present invention comprises preferably 65% to 75% by weight of the base oil (A) and 25% to 35% by weight of the polyalkyl(meth)acrylate based polymer (B), based on the total weight of the additive composition.

Preferred additive compositions according to the present invention comprise polyalkyl (meth)acrylate based copolymers (B) as mentioned further above, comprising:
 (a) 20 to 35% by weight of straight chained or branched $C_{1-4}$-alkyl (meth)acrylates;
 (b) 50 to 65% by weight of straight chained or branched $C_{10-16}$-alkyl (meth)acrylates; and
 (c) 7 to 15% by weight of straight chained $C_{18-24}$-alkyl (meth)acrylates.

The content of each component (a), (b) and (c) is based on the total composition of the polyalkyl(meth)acrylate based polymer (B).

In a particular embodiment, the proportions of components (a), (b) and (c) add up to 100% by weight.

Further preferred additive compositions according to the present invention comprise polyalkyl (meth)acrylate based copolymers (B) as mentioned further above, comprising:
 (a) 20 to 35% by weight of straight chained or branched $C_{1-4}$-alkyl (meth)acrylates;
 (b) 50 to 65% by weight of straight chained or branched $C_{10-16}$-alkyl (meth)acrylates; and
 (c) 10 to 14% by weight of straight chained $C_{18-24}$-alkyl (meth)acrylates.

The content of each component (a), (b) and (c) is based on the total composition of the polyalkyl(meth)acrylate based polymer (B).

In a particular embodiment, the proportions of components (a), (b) and (c) add up to 100% by weight.

The additive compositions are characterized by their contribution to kinematic viscosity and HTHS performance of lubricating oil compositions.

A further object of the present invention is therefore directed to the use of an additive composition according to the present invention to improve the kinematic viscosity and HTHS performance of lubricating oil compositions, especially of engine oil formulations.

A further object of the present invention is directed to a method of improving the kinematic viscosity and HTHS performance of lubricating oil compositions, especially of engine oil formulations, by adding an additive composition according to the present invention.

A further object of the present invention is directed to the use of an additive composition according to the present invention to increase $KV_{100}$ and in parallel decrease $HTHS_{100}$ of lubricating oil compositions, especially of engine oil formulations (when formulated to a defined $HTHS_{150}$, e.g. for HTHS150 of 2.6 mPas for a 0W20 formulation).

A further object of the present invention is directed to a method of increasing $KV_{100}$ and in parallel decreasing $HTHS_{100}$ of lubricating oil compositions, especially of engine oil formulations (when formulated to a defined $HTHS_{150}$, e.g. for HTHS150 of 2.6 mPas for a 0W20 formulation), by adding an additive composition according to the present invention.

Another object of the present invention is directed to additive compositions as mentioned further above, which further comprise:
 (C) 0 to 3% by weight of a polyalkyl (meth)acrylate based copolymer, characterized by an average carbon number of 12.0 to 13.0 and a weight-average molecular weight $M_w$ of 10,000 to 100,000 g/mol,
 based on the total weight of the additive composition.

The average carbon number corresponds to the molar average of all carbon atoms present in the alkyl residue of each alkyl (meth)acrylate forming the polyalkyl (meth)acrylate based copolymer and was calculated based on the total composition of the polyalkyl (meth)acrylate based copolymer, i.e. by calculating the molar average of all carbon atoms present in the alkyl residues of the alkyl (meth)acrylates.

Component (C) is added as pour point depressant (PPD). The effectiveness of PPDs has been quantified by determining the temperature just before which a lubricating oil becomes unable to flow (the pour point). PPDs were therefore traditionally selected on the basis of their ability to lower the pour point. The pour point, however, is not the only indicator of a lubricating oil's low-temperature performance. Another important performance indicator for engine oil is the oil's pumpability at low temperature as determined according to ASTM D4684. The pumpability is measured in terms of the low-shear rate viscosity and the yield stress. Both parameters are determined by a Mini Rotary Viscometer (MRV) using a standardized cooling profile (TP-1), according to which the oil is cooled from −5 to −40° C. at a rate as described in ASTM D4684 (in the case of 0W grade). The oil pumpability according to ASTM D4684 is also included as an important requirement in the international engine oil standard SAE J300.

Component (C) is further characterized by an average carbon number of 12.5 to 13.0. The weight-average molecular weight of the polyalkyl(meth)acrylate based copolymer is preferably in the range of 50,000 to 90,000 g/mol.

The polyalkyl(meth)acrylate based copolymer of component (C) does further comprise:
  (a) 88 to 98% by weight of straight chained or branched $C_{10-16}$-alkyl (meth)acrylates;
  (b) 2 to 6% by weight of straight chained $C_{18-24}$-alkyl (meth)acrylates; and
  (c) 0 to 10% by weight of straight chained or branched $C_{1-4}$-alkyl (meth)acrylates.

The content of each component (a), (b) and (c) is based on the total composition of the polyalkyl(meth)acrylate based polymer (C).

In a particular embodiment, the proportions of components (a), (b) and (c) add up to 100% by weight.

The polyalkyl(meth)acrylate based copolymer of component (C) does further comprise:
  (a) 95 to 97% by weight of straight chained or branched $C_{10-16}$-alkyl (meth)acrylates; and
  (b) 3 to 5% by weight of straight chained $C_{18-24}$-alkyl (meth)acrylates.

The content of each component (a) and (b) is based on the total composition of the polyalkyl(meth)acrylate based polymer (C).

In a particular embodiment, the proportions of components (a) and (b) add up to 100% by weight.

A third object of the present invention is directed to a lubricating oil composition, comprising:
  (A) 81.4% to 98.97% by weight of a base oil;
  (B) 1 to 3% by weight of a polyalkyl (meth)acrylate based copolymer, characterized by an average carbon number of 7.0 to 7.5 and a weight-average molecular weight $M_w$ of 300,000 g/mol or greater;
  (C) 0.03% to 0.6% by weight of a polyalkyl (meth)acrylate based copolymer, characterized by an average carbon number of 12.0 to 13.0 and a weight-average molecular weight $M_w$ of 10,000 to 100,000 g/mol; and
  (D) 0 to 15% by weight of one or more further additives.

The content of each component (A), (B), (C) and (D) is based on the total composition of the lubricating oil composition.

In a particular embodiment, the proportions of components (A), (B), (C) and (D) add up to 100% by weight.

The lubricating oil compositions according to the present invention are characterized by their low $KV_{40}$ and high $KV_{100}$ values, determined to ASTM D7042, and their low $HTHS_{100}$ values, determined to ASTM D6616, and their low treat rate.

When formulated to a given $HTHS_{150}$ target of 2.6 mPas for a 0W20 formulation according to SAE J300, the lubricating oil formulations of the present invention show $KV_{40}$ values in the range of 33 to 36 mm$^2$/s (33 to 37 mm$^2$/s with different PPDs).

The $KV_{100}$ values are in the range of 6.9 to 9.3 mm$^2$/s as defined by the J300 specification.

The lubricating oil compositions according to the present invention are further characterized by a high viscosity index (VI). The VI is at least 215 for 0W20 formulations, preferably in the range of 215 to 240.

Preferably, the total concentration of the one or more additives (D) is 0.05% to 15% by weight, more preferably 3% to 10% by weight, based on the total weight of the lubricating oil composition.

Preferred lubricating oil compositions according to the present invention comprise polyalkyl (meth)acrylate based copolymers (B) as mentioned further above, comprising:
  (a) 20 to 35% by weight of straight chained or branched $C_{1-4}$-alkyl (meth)acrylates;
  (b) 50 to 65% by weight of straight chained or branched $C_{10-16}$-alkyl (meth)acrylates; and
  (c) 7 to 15% by weight of straight chained $C_{18-24}$-alkyl (meth)acrylates.

The content of each component (a), (b) and (c) is based on the total composition of the polyalkyl(meth)acrylate based polymer (B).

In a particular embodiment, the proportions of components (a), (b) and (c) add up to 100% by weight.

Further preferred lubricating oil compositions according to the present invention comprise polyalkyl (meth)acrylate based copolymers (B) as mentioned further above, comprising:
  (a) 20 to 35% by weight of straight chained or branched $C_{1-4}$-alkyl (meth)acrylates;
  (b) 50 to 65% by weight of straight chained or branched $C_{10-16}$-alkyl (meth)acrylates; and
  (c) 10 to 14% by weight of straight chained $C_{18-24}$-alkyl (meth)acrylates.

The content of each component (a), (b) and (c) is based on the total composition of the polyalkyl(meth)acrylate based polymer (B).

In a particular embodiment, the proportions of components (a), (b) and (c) add up to 100% by weight.

Component (C) is further characterized by an average carbon number of 12.5 to 13.0. The weight-average molecular weight of the polyalkyl(meth)acrylate based copolymer is preferably in the range of 50,000 to 90,000 g/mol.

The polyalkyl(meth)acrylate based copolymer of component (C) does further comprise:
  (a) 88 to 98% by weight of straight chained or branched $C_{10-16}$-alkyl (meth)acrylates;
  (b) 2 to 6% by weight of straight chained $C_{18-24}$-alkyl (meth)acrylates; and
  (c) 0 to 10% by weight of straight chained or branched $C_{1-4}$-alkyl (meth)acrylates.

The content of each component (a), (b) and (c) is based on the total composition of the polyalkyl(meth)acrylate based polymer (C).

In a particular embodiment, the proportions of components (a). (b) and (c) add up to 100% by weight.

The polyalkyl(meth)acrylate based copolymer of component (C) does further comprise:
  (a) 95 to 97% by weight of straight chained or branched $C_{10-16}$-alkyl (meth)acrylates; and
  (b) 3 to 5% by weight of straight chained $C_{18-24}$-alkyl (meth)acrylates.

The content of each component (a) and (b) is based on the total composition of the polyalkyl(meth)acrylate based polymer (C).

In a particular embodiment, the proportions of components (a) and (b) add up to 100% by weight.

The lubricating oil composition according to the invention may also contain, as component (D), further additives selected from the group consisting of conventional VI improvers, dispersants, defoamers, detergents, antioxidants, pour point depressants (other than those specified further above as component (C)), antiwear additives, extreme pressure additives, friction modifiers, anticorrosion additives, dyes and mixtures thereof.

Conventional VI improvers include hydrogenated styrene-diene copolymers (HSDs, U.S. Pat. Nos. 4,116,917, 3,772,196 and 4,788,316), especially based on butadiene and isoprene, and also olefin copolymers (OCPs, K. Marsden: "Literature Review of OCP Viscosity Modifiers", Lubrication Science 1 (1988), 265), especially of the poly (ethylene-co-propylene) type, which may often also be present in N/O-functional form with dispersing action, or PAMAs, which are usually present in N-functional form with advantageous additive properties (boosters) as dispersants, wear protection additives and/or friction modifiers (DE 1 520 696 to Röhm and Haas. WO 2006/007934 to RohMax Additives).

Compilations of VI improvers and pour point improvers for lubricant oils, especially motor oils, are detailed, for example, in T. Mang, W. Dresel (eds.): "Lubricants and Lubrication". Wiley-VCH, Weinheim 2001: R. M. Mortier, S. T. Orszulik (eds.): "Chemistry and Technology of Lubricants", Blackie Academic & Professional, London 1992: or J. Bartz: "Additive für Schmierstoffe", Expert-Verlag, Renningen-Malmsheim 1994.

Appropriate dispersants include poly-(isobutylene) derivatives, for example poly(isobutylene)succinimides (PIBSIs), including borated PIBSIs; and ethylene-propylene oligomers having N/O functionalities.

Dispersants (including borated dispersants) are preferably used in an amount of 0 to 5% by weight, based on the total amount of the lubricating oil composition.

Suitable defoamers are silicone oils, fluorosilicone oils, fluoroalkyl ethers, etc.

The defoaming agent is preferably used in an amount of 0.005 to 0.1% by weight, based on the total amount of the lubricating oil composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 1% by weight, based on the total amount of the lubricating oil composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4,4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butyl phenol); 4,4'-butylidenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethyl-phenol; 2,4-dimethyl-6-t-butylphenol; 2,6-di-t-amyl-p-cresol; 2,6-di-t-butyl-4-(N,N'-dimethylaminomethylphenol); 4,4'thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl) sulfide; n-octyl-3-(4-hydroxy-3,5-di-t-butylphenyl)propionate; n-octadecyl-3-(4-hydroxy-3,5-di-t-butylphenyl)propionate; 2,2'-thio[diethyl-bis-3-(3,5-di-t-butyl-4-hydroxyphenyl)propionate], etc. Of those, especially preferred are bis-phenol-based antioxidants and ester group containing phenol-based antioxidants.

The amine-based antioxidants include, for example, monoalkyldiphenylamines such as monooctyldiphenylamine, monononyldiphenylamine, etc.; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, 4,4'-dinonyldiphenylamine, etc.; polyalkyldiphenylamines such as tetrabutyldiphenylamine, tetrahexyldiphenylamine, tetraoctyldiphenylamine, tetranonyldiphenylamine, etc.; naphthylamines, concretely alpha-naphthylamine, phenyl-alpha-naphthylamine and further alkyl-substituted phenyl-alpha-naphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine, etc. Of those, diphenylamines are preferred to naphthylamines, from the viewpoint of the antioxidation effect thereof.

Suitable antioxidants may further be selected from the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, alpha-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

Antioxidants are used in an amount of 0 to 15% by weight, preferably 0.1 to 10% by weight, more preferably 0.5 to 5% by weight, based on the total amount of the lubricating oil composition.

The pour-point depressants (other than those as mentioned as component (C) further above) include ethylene-vinyl acetate copolymers, chlorinated paraffin-naphthalene condensates, chlorinated paraffin-phenol condensates, polyalkylstyrenes, etc.

The amount of the pour point depressant is preferably from 0.1 to 5% by weight, based on the total amount of the lubricating oil composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, polysulfides, etc.; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds, etc.; sulfur and phosphorus-containing anti-wear agents such as thiophosphites, thiophosphates, thiophosphonates, amine salts or metal salts of those compounds, etc.

The antiwear agent may be present in an amount of 0 to 3% by weight, preferably 0.1 to 1.5% by weight, more preferably 0.5 to 0.9% by weight, based on the total amount of the lubricating oil composition.

Friction modifiers used may include mechanically active compounds, for example molybdenum disulfide, graphite (including fluorinated graphite), poly(trifluoroethylene), polyamide, polyimide; compounds that form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds that form polymer-like layers, for example ethoxylated dicarboxylic partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTCs) and combinations thereof with ZnDTPs, copper-containing organic compounds.

Friction modifiers may be used in an amount of 0 to 6% by weight, preferably 0.05 to 4% by weight, more preferably 0.1 to 2% by weight, based on the total amount of the lubricating oil composition.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R M. Mortier, S. T. Orszulik (eds.): "Chemistry and Technology of Lubricants".

The polyalkyl(meth)acrylate based polymers in accordance with the invention can be prepared by free-radical polymerization and by related methods of controlled free-radical polymerization, for example ATRP (=atom transfer radical polymerization) or RAFT (=reversible addition fragmentation chain transfer).

Standard free-radical polymerization is detailed, inter alia, in Ullmann's Encyclopedia of Industrial Chemistry, Sixth Edition. In general, a polymerization initiator and optionally a chain transfer agent are used for this purpose.

The usable initiators include azo initiators widely known in the technical field, such as AIBN and 1,1-azobiscyclohexanecarbonitrile, and also peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis (2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis (4-tert-butylcyclohexyl) peroxydicarbonate, mixtures of two or more of the aforementioned compounds with one another, and mixtures of the aforementioned compounds with unspecified compounds which can likewise form free radicals. Suitable chain transfer agents are especially oil-soluble mercaptans, for example n-dodecyl mercaptan or 2-mercaptoethanol, or else chain transfer agents from the class of the terpenes, for example terpinolene.

The ATRP method is known in the art. It is assumed that this is a "living" free-radical polymerization, but no restriction is intended by the description of the mechanism. In these processes, a transition metal compound is reacted with a compound having a transferable atom group. This involves transfer of the transferable atom group to the transition metal compound, as a result of which the metal is oxidized. This reaction forms a free radical which adds onto ethylenic groups. However, the transfer of the atom group to the transition metal compound is reversible, and so the atom group is transferred back to the growing polymer chain, which results in formation of a controlled polymerization system. It is accordingly possible to control the formation of the polymer, the molecular weight and the molecular weight distribution.

This reaction regime is described, for example, by J.-S. Wang, et al., J. Am. Chem. Soc, vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-elucidated ATRP. In addition, the polymers of the invention can also be obtained via RAFT methods, for example. This method is described in detail, for example, in WO 98/01478 and WO 2004/083169.

The polymerization can be conducted under standard pressure, reduced pressure or elevated pressure. The polymerization temperature is also uncritical. In general, however, it is in the range from −20 to 200° C., preferably 50 to 150° C. and more preferably 80 to 130° C.

The polymerization can be conducted with or without solvent. The term "solvent" should be understood here in a broad sense. The solvent is selected according to the polarity of the monomers used, it being possible with preference to use 100N oil, comparatively light gas oil and/or aromatic hydrocarbons, for example toluene or xylene.

The invention has been further illustrated by the following non-limiting examples.

EXAMPLES

| | Abbreviations |
|---|---|
| AMA | alkyl methacrylate |
| ADVN | 2,2'-azobis(2,4-dimethyl)-valeronitrile |
| BMA | $C_4$-alkyl methacrylate = n-butyl methacrylate |
| Chevron 100R | Chevron Neutral Oil 100R, Group II base oil from Chevron with a $KV_{100}$ of 4.1 cSt |
| Chevron 150R | Chevron Neutral Oil 150R, Group II base oil from Chevron with a $KV_{100}$ of 5.3 cSt |
| DDM | dodecanethiol |
| DPMA | $C_{12-15}$-alkyl methacrylate (mass average carbon number = 13.4), linear 77% |
| GPC | gel permeation chromatography |
| IDMA | $C_{10}$-alkyl methacrylate (iso-decyl methacrylate), linear 0% |
| $HTHS_{100}$ | high-temperature high-shear viscosity @ 100° C., measured according to ASTM D6616 |
| $HTHS_{150}$ | high-temperature high-shear viscosity @ 150° C., measured according to ASTM D4683 |
| KV | kinematic viscosity measured according to ASTM D445 |

-continued

| Abbreviations | |
|---|---|
| $KV_{40}$ | kinematic viscosity @ 40° C., measured according to ASTM D7042 |
| $KV_{100}$ | kinematic viscosity @100° C., measured according to ASTM D7042 |
| LMA | lauryl methacrylate (mass average carbon number = 12.5), 73% C12, 27% C14, all linear |
| MMA | $C_1$-alkyl methacrylate = methyl methacrylate |
| $M_n$ | number-average molecular weight |
| $M_w$ | weight-average molecular weight |
| OLOA 55501 | DI (dispersant inhibitor) package for PCMO, commercially available from Oronite |
| PCMO | passenger car motor oil |
| PDI | polydispersity index |
| PPD | pour point depressant |
| SMA | stearyl methacrylate (mass average carbon number = 17.1), 6% C14, 30% C16, 64% C18, all linear |
| tBPO | tert-butyl-peroxy-2-ethyl-hexanoate |
| VI | viscosity index, measured according to ISO 2909 |
| Yubase 4 | Group III base oil from SK Lubricants with a $KV_{100}$ of 4.2 cSt |

Test Methods

The polyalkyl (meth)acrylate based copolymers according to the present invention and the comparative examples were characterized with respect to their molecular weights and PDI.

The weight-average molecular weight $M_w$ and the number-average molecular weights $M_n$ were determined by gel permeation chromatography (GPC) with RI (refractive index) detector in tetrahydrofuran at 40° C. using a polymethyl methacrylate calibration. A combination of PSS-SDV Linear XL 10μ*2 and PSS-SDV 100A columns was used. Flow rate was 1 mL/min. Injection volume was 100 μL.

The lubricating oil compositions comprising the polyalkyl (meth)acrylate based copolymers according to the present invention and comparative examples were characterized with respect to their viscosity index (VI) to, to their kinematic viscosity at 40° C. ($KV_{40}$) and 100° C. ($KV_{100}$) to ASTM D7042, to their high-temperature high-shear viscosity at 100° C. ($HTHS_{100}$) to ASTM D6616 and their high-temperature high-shear viscosity at 150° C. ($HTHS_{150}$) to ASTM D4683. They were further evaluated for MRV (mini rotary viscometry) low-temperature pumpability by measuring the low-shear viscosity at −40° C. and yield stress according to ASTM D4684.

For the solubility tests, 7.5% by weight of polymer was dissolved in a base oil mixture of 75% by weight of Yubase 4 and 25% by weight of PAO4 at 80° C. for 1 hour. After that, the solution was kept at 25° C. for 1 day and then the appearance was observed.

Synthesis of Polyalkyl(Meth)Acrylate Based Copolymers

Preparation of Polymers A to J

A 4-neck glass round bottom flask equipped with condenser, stirrer and thermocouple was initially charged with a monomer mixture consisting of monomers and DDM as shown in Table 1 and 131 g of Chevron 100R. The monomer mixture was heated to 100° C. under nitrogen gas atmosphere for 30 minutes.

10% by weight of the total initiator was added to the flask over 60 minutes. Then 20% by weight of the total initiator feed mixture was added to the flask over 60 minutes. After that, reaction temperature was increased to 105° C. then the remaining initiator feed mixture was added to the flask over 45 minutes.

60 minutes after the feed ended, 0.41 g of tBPO was added to the flask. The reaction mixture was held at 105° C. for 60 minutes then 364 g of Chevron 100R was added and stirred at 105° C. for 60 minutes and working example Polymer A to I and comparative example Polymer J were obtained.

The composition of polymer J corresponds to the monomer composition of Example 10 of U.S. Pat. No. 5,834,408.

Preparation of Polymer K

A 4-neck glass round bottom flask equipped with condenser, stirrer and thermocouple was initially charged with the monomer mixture consisting of monomers and DDM as shown in Table 1 and 131 g of Chevron 100R. The monomer mixture was heated to 110° C. under nitrogen gas atmosphere for 30 minutes.

15% by weight of the total initiator was added to the flask over 60 minutes. Then 20% by weight of the total initiator feed mixture was added to the flask over 60 minutes. After that, reaction temperature was increased to 105° C., then the remaining initiator feed mixture was added to the flask over 45 minutes.

The reaction mixture was held at 105° C. for 30 minutes then 277 g of Chevron 100R was added and stirred at 105° C. for 60 minutes and comparative example Polymer K was obtained.

Preparation of Polymer L

A 4-neck glass round bottom flask equipped with condenser, stirrer and thermocouple was initially charged with the monomer mixture consisting of monomers and DDM as shown in Table 1 and 200 g of Chevron 100R. The monomer mixture was heated to 100° C. under nitrogen gas atmosphere for 30 minutes.

10% by weight of the total initiator was added to the flask over 60 minutes. Then 20% by weight of the total initiator feed mixture was added to the flask over 60 minutes. After that, reaction temperature was increased to 105° C., then the remaining initiator feed mixture was added to the flask over 45 minutes.

60 minutes after the feed ended, 0.41 g of tBPO was added to the flask. The reaction mixture was held at 105° C. for 60 minutes then 294 g of Chevron 100R was added and stirred at 105° C. for 60 minutes and comparative example Polymer L was obtained.

Preparation of Polymer M

Comparative example Polymer M was prepared according to the protocol disclosed further above for the preparation of polymer A.

Preparation of Polymer N

Polymer N corresponds to Example 10 of U.S. Pat. No. 5,834,408 and was prepared according to the protocol disclosed therein (see especially column 5, line 50 to column 7, line 12).

Preparation of Polymer O

The composition of Polymer O corresponds to the monomer composition of Example 10 of U.S. Pat. No. 5,834,408, but comparative example Polymer O was prepared by following the protocol disclosed further above for the preparation of Polymer A. Polymer O has a similar $M_w$ as Polymer A.

Preparation of Polymer P

A 4-neck glass round bottom flask equipped with condenser, stirrer and thermocouple was initially charged with the monomer mixture consisting of monomers and DDM as shown in Table 1 and 12 g of Chevron 100R. The monomer mixture was heated to 120° C. under nitrogen gas atmosphere for 30 minutes.

10% by weight of the total initiator was added to the flask over 30 minutes. Then 20% by weight of the total initiator feed mixture was added to the flask over 40 minutes. After that, reaction temperature was increased to 105° C., then the remaining initiator feed mixture was added to the flask over 30 minutes.

The reaction mixture was held at 105° C. for 30 minutes. Then 98 g of Chevron 100R was added and stirred at 105° C. for 60 minutes and comparative example Polymer P was obtained.

Preparation of Polymer Q

A 4-neck glass round bottom flask equipped with condenser, stirrer and thermocouple was initially charged with the monomer mixture consisting of monomers and DDM as shown in Table 1 and 98 g of Chevron 100R. The monomer mixture was heated to 100° C. under nitrogen gas atmosphere for 30 minutes.

10% by weight of the total initiator was added to the flask over 60 minutes. Then 20% by weight of the total initiator feed mixture was added to the flask over 60 minutes. After that, reaction temperature was increased to 105° C. Then the remaining initiator feed mixture was added to the flask over 45 minutes.

60 minutes after the feed ended, 0.37 g of tBPO was added to the flask. The reaction mixture was held at 105° C. for 60 minutes then 14 g of Chevron 100R was added and stirred at 105° C. for 60 minutes and comparative example Polymer Q was obtained.

Preparation of Polymer R

A 4-neck glass round bottom flask equipped with condenser, stirrer and thermocouple was initially charged with the monomer mixture consisting of monomers and DDM as shown in Table 1 and 16 g of Chevron 150R. The monomer mixture was heated to 120° C. under nitrogen gas atmosphere for 30 minutes.

10% by weight of the total initiator was added to the flask over 45 minutes. Then 20% by weight of the total initiator feed mixture was added to the flask over 45 minutes. After that, reaction temperature was increased to 105° C. and the remaining initiator feed mixture was added to the flask over 45 minutes.

The reaction mixture was held at 105° C. for 30 minutes. Then 158 g of Chevron 150R was added and stirred at 105° C. for 60 minutes and comparative example Polymer R was obtained.

Preparation of Polymer S

A 4-neck glass round bottom flask equipped with condenser, stirrer and thermocouple was initially charged with the monomer mixture consisting of monomers and DDM as shown in Table 1 and 7 g of Chevron 100R. The monomer mixture was heated to 120° C. under nitrogen gas atmosphere for 30 minutes.

22% by weight of the total initiator was added to the flask over 90 minutes. Then 32% by weight of the total initiator feed mixture was added to the flask over 60 minutes. After that, reaction temperature was increased to 105° C. Then the remaining initiator feed mixture was added to the flask over 52 minutes.

The reaction mixture was held at 105° C. for 30 minutes. Then 95 g of Chevron 100R was added and stirred at 105° C. for 60 minutes and comparative example Polymer S was obtained.

Table 1 shows the reaction mixtures used to prepare working examples and comparative examples.

The net compositions of the resulting polyalkyl(meth)acrylate polymers are summarized in the following Table 2. The monomer contents add up to 100% by weight; the amount of DDM is given relative to the total monomer content.

TABLE 1

Reaction mixtures used to prepare working examples and comparative examples.

| Example # | MMA [g] | BMA [g] | IDMA [g] | DPMA [g] | LMA [g] | SMA [g] | C12 AMA [g] | C14 AMA [g] | C16 AMA [g] | C18 AMA [g] | DDM [g] | tBPO [g] | ADVN [g] |
|---|---|---|---|---|---|---|---|---|---|---|---|---|---|
| Polymer A | 50.8 | 10.2 | 0.2 | 36.5 | 64.8 | 40.6 | — | — | — | — | 0.15 | 0.508 | — |
| Polymer B | 50.8 | — | — | — | 111.7 | 40.6 | — | — | — | — | 0.144 | 0.508 | — |
| Polymer C | 50.8 | 5.1 | — | 36.5 | 70.0 | 40.6 | — | — | — | — | 0.132 | 0.508 | — |
| Polymer D | 50.8 | 10.2 | 0.2 | 36.5 | 59.7 | 45.7 | — | — | — | — | 0.142 | 0.508 | — |
| Polymer E | 50.8 | 10.2 | 0.2 | 36.5 | 55.6 | 45.7 | — | — | — | — | 0.132 | 0.508 | — |
| Polymer F | 50.8 | 10.2 | 0.2 | 36.5 | 64.8 | 40.6 | — | — | — | — | 0.091 | 0.508 | — |
| Polymer G | 50.8 | 10.2 | 0.2 | 36.5 | 64.8 | 40.6 | — | — | — | — | 0.1 | 0.508 | — |
| Polymer H | 50.8 | 10.2 | 0.2 | 36.5 | 64.8 | 40.6 | — | — | — | — | 0.146 | 0.508 | — |
| Polymer I | 50.8 | 10.2 | 0.2 | 36.5 | 64.8 | 40.6 | — | — | — | — | 0.181 | 0.508 | — |
| Polymer J*) | 40.6 | — | — | — | — | — | 101.5 | — | — | 60.9 | 0.077 | 0.508 | — |
| Polymer K*) | 32.0 | — | — | — | 186.0 | 72.6 | — | — | — | — | 0.291 | 0.581 | — |
| Polymer L*) | 71.1 | — | — | — | — | — | 132.0 | — | — | — | 0.083 | 0.508 | — |
| Polymer M*) | 50.8 | 10.2 | 0.2 | 36.5 | 64.8 | 40.6 | — | — | — | — | 0.373 | 0.508 | — |
| Polymer N*) | 54.0 | — | — | — | — | — | 63.0 | 27.0 | 25.9 | 11.1 | 1.8 | — | 0.846 |
| Polymer O*) | 60.9 | — | — | — | — | — | 71.1 | 30.5 | 29.3 | 12.6 | 0.132 | 0.508 | — |
| PPDs |
| Polymer P | — | — | — | — | 176.1 | 11.4 | — | — | — | — | 0.769 | 0.375 | — |
| Polymer Q*) | — | — | — | — | 174.4 | 11.3 | — | — | — | — | 0.111 | 0.464 | — |
| Polymer R*) | — | — | — | 0.25 | 91.5 | 32.4 | — | — | — | — | 0.919 | 0.248 | — |
| Polymer S*) | — | — | — | — | 166.0 | 29.3 | — | — | — | — | 1.055 | 0.312 | — |

*)comparative example

TABLE 2

Net compositions of the polymers prepared according to the present invention.

| Example # | MMA [%] | BMA [%] | IDMA [%] | DPMA [%] | LMA [%] | SMA [%] | C12 AMA [%] | C14 AMA [%] | C16 AMA [%] | C18 AMA [%] | DDM (relative to monomers) [%] |
|---|---|---|---|---|---|---|---|---|---|---|---|
| Polymer A | 25.0 | 5.0 | 0.1 | 18.0 | 31.9 | 20.0 | — | — | — | — | 0.074 |
| Polymer B | 25.0 | — | — | — | 55.0 | 20.0 | — | — | — | — | 0.071 |
| Polymer C | 25.0 | 2.5 | — | 18.0 | 34.5 | 20.0 | — | — | — | — | 0.065 |
| Polymer D | 25.0 | 5.0 | 0.1 | 18.0 | 29.4 | 22.5 | — | — | — | — | 0.070 |
| Polymer E | 25.0 | 7.0 | 0.1 | 18.0 | 27.4 | 22.5 | — | — | — | — | 0.065 |
| Polymer F | 25.0 | 5.0 | 0.1 | 18.0 | 31.9 | 20.0 | — | — | — | — | 0.045 |
| Polymer G | 25.0 | 5.0 | 0.1 | 18.0 | 31.9 | 20.0 | — | — | — | — | 0.049 |
| Polymer H | 25.0 | 5.0 | 0.1 | 18.0 | 31.9 | 20.0 | — | — | — | — | 0.072 |
| Polymer I | 25.0 | 5.0 | 0.1 | 18.0 | 31.9 | 20.0 | — | — | — | — | 0.089 |
| Polymer J*⁾ | 20.0 | — | — | — | — | — | 50.0 | — | — | 30.0 | 0.038 |
| Polymer K*⁾ | 11.0 | — | — | — | 64.0 | 25.0 | — | — | — | — | 0.340 |
| Polymer L*⁾ | 35.0 | — | — | — | — | — | 65.0 | — | — | — | 0.041 |
| Polymer M*⁾ | 25.0 | 5.0 | 0.1 | 18.0 | 31.9 | 20.0 | — | — | — | — | 0.184 |
| Polymer N*⁾ | 30.0 | — | — | — | — | — | 35.0 | 15.0 | 14.0 | 6.0 | 1.000 |
| Polymer O*⁾ | 30.0 | — | — | — | — | — | 35.0 | 15.0 | 14.0 | 6.0 | 0.065 |
| PPDs | | | | | | | | | | | |
| Polymer P | — | — | — | — | 94.0 | 6.0 | — | — | — | — | 0.410 |
| Polymer Q*⁾ | — | — | — | — | 94.0 | 6.0 | — | — | — | — | 0.060 |
| Polymer R*⁾ | — | — | — | — | 73.8 | 26.2 | — | — | — | — | 0.740 |
| Polymer S*⁾ | — | — | — | — | 85.0 | 15.0 | — | — | — | — | 0.540 |

*⁾comparative example

The characteristic weight-average molecular weights $M_w$, number-average molecular weights $M_n$, polydispersity indices (PDI) of the resulting polyalkyl(meth)acrylate polymers as well as their average C-numbers are summarized in the following Table 3.

TABLE 3

Typical properties of the examples and comparative examples.

| Example # | $M_n$ [g/mol] | $M_w$ [g/mol] | PDI [%] | average C-number | C18-24 AMA [%] |
|---|---|---|---|---|---|
| Polymer A | 117,000 | 541,000 | 4.6 | 7.2 | 13 |
| Polymer B | 101,000 | 437,000 | 4.3 | 7.5 | 13 |
| Polymer C | 123,000 | 521,000 | 4.2 | 7.4 | 13 |
| Polymer D | 114,000 | 539,000 | 4.7 | 7.3 | 14 |
| Polymer E | 108,000 | 497,000 | 4.6 | 7.1 | 14 |
| Polymer F | 144,000 | 951,000 | 6.6 | 7.2 | 13 |
| Polymer G | 129,000 | 635,000 | 4.9 | 7.2 | 13 |
| Polymer H | 112,000 | 451,000 | 4.0 | 7.2 | 13 |
| Polymer I | 105,000 | 343,000 | 3.3 | 7.2 | 13 |
| Polymer J*⁾ | 108,000 | 468,000 | 4.3 | 8.6 | 30 |
| Polymer K*⁾ | 88,000 | 264,000 | 3.0 | 10.4 | 16 |
| Polymer L*⁾ | 117,000 | 377,000 | 3.2 | 5.6 | 0 |
| Polymer M*⁾ | 68,000 | 168,000 | 2.5 | 7.2 | 13 |
| Polymer N*⁾ | 17,000 | 36,000 | 2.1 | 6.8 | 6 |
| Polymer O*⁾ | 96,000 | 486,000 | 5.1 | 6.8 | 6 |
| PPDs | | | | | |
| Polymer P | 37,000 | 79,000 | 2.1 | 12.7 | 4 |
| Polymer Q*⁾ | 95,000 | 500,000 | 5.3 | 12.7 | 4 |
| Polymer R*⁾ | 31,000 | 62,000 | 2.0 | 13.5 | 17 |
| Polymer S*⁾ | 38,000 | 83,000 | 2.2 | 13.9 | 10 |

*⁾comparative example

Polymers A to I are in accordance with the present invention; i.e. their compositions, molecular weights and average carbon numbers are within the claimed ranges.

The average carbon number corresponds to the molar average of all carbon atoms present in the alkyl residue of each alkyl (meth)acrylate forming the polyalkyl (meth) acrylate based copolymer and was calculated based on the total composition of the polyalkyl (meth)acrylate based copolymer, i.e. by calculating the molar average of all carbon atoms present in the alkyl residues of the alkyl (meth)acrylates.

Polymer J is a comparative example as the average carbon number is higher than the claimed range. From the formulation results presented further down it is visible that the performance of this polymer in an engine oil formulation is not acceptable.

Polymer K is a comparative example as weight-average molecular weight $M_w$ and average carbon number are outside the claimed ranges. From the formulation results presented further down it is visible that the performance of this polymer in an engine oil formulation is not acceptable.

Polymer L is a comparative example as the average carbon number is outside the claimed range. This polymer was not soluble in an engine oil formulation.

Polymer M is a comparative example as the weight-average molecular weight $M_w$ is outside the claimed range. From the formulation results presented further down it is visible that the performance of this polymer in an engine oil formulation is not acceptable.

Polymer N is a comparative example as weight-average molecular weight $M_w$ and average carbon number are outside the claimed ranges. The composition as well as the molecular weight of Polymer N correspond to working example 15 of US67469993. From the formulation results presented further down it is visible that the performance of this polymer in an engine oil formulation is not acceptable.

Polymer O is a comparative example as the average carbon number is outside the claimed range. The composition corresponds to working example 15 of US67469993 as well, but this polymer was prepared with a higher molecular weight. From the formulation results presented further down it is visible that a higher molecular weight does not lead to a better performance of this polymer in an engine oil formulation. This polymer was insoluble in an engine oil formulation.

Polymers A, F, G, H and I do all have the same composition but different weight-average molecular weights (see data presented in Table 3).

Same composition also means that they have the same content of C18-24 (meth)acrylates and, based thereon, the same average carbon number.

To show the influence of $M_w$ on the performance of the corresponding polymer in a 0W20 engine oil formulation, polymer M was prepared which has the same composition as polymers A, F, G, H and I, but a lower $M_w$. As can be seen from Table 4b, the values for $HTHS_{100}$ are much higher than those of the corresponding polymers with a molecular weight above 300.000 g/mol.

Comparative example Polymer N corresponds to example no. 15 of U.S. Pat. No. 6,746,993. The performance in a 0W20 engine oil formulation is shown in Table 4b (see formulation example 14). It can be seen that the $HTHS_{100}$ value is much higher than those of the polymers with a weight-average molecular weight of 300,000 g/mol or greater. The formulation passed yield stress but had a significantly higher HTHS100 value. This means that, correspondingly, fuel consumption will be much higher than with Polymers A to I. To show that not only a high $M_w$ is needed but also the average carbon number plays a significant role, Polymer O was prepared which has the same composition as Polymer N but a high $M_w$. This polymer was insoluble in a 0W20 engine oil formulation (see formulation example 15 disclosed in Table 4b).

Polymers P, Q, R and S Represent Different Pour Point Depressants PPDs.

Polymer P is in accordance with the present invention, i.e. its composition, molecular weight and average carbon number are within the claimed ranges.

Polymer Q is a comparative example as it has the same composition as Polymer P and, therefore, the same average carbon number as well but has a much higher molecular weight.

Polymers R and S are comparative examples as their compositions and average carbon numbers are outside the claimed ranges.

Evaluation of VI Improvers in Formulations

To demonstrate the effect of the polymers prepared in accordance with the present invention as well as of the comparative examples on the $KV_{100}$ and $HTHS_{100}$ performance of lubricating oil compositions different formulation examples were prepared and the corresponding values are measured. Formulations with Yubase 4 as base oil were prepared by using formulation targets of 0W20 according to SAE J300; i.e. it was formulated to an $HTHS_{150}$ target of 2.6 mPas by adding the polymers as described in Table 2 above. The resulting treat rate was typically between 6 and 8% by weight for the polymers which are in accordance with the present invention. As DI package was used the commercially available OLOA 55501. It was added for all examples in the usual amount of 8.9% by weight. All formulation examples do also contain Polymer Q.

Characteristic EO formulation properties ($KV_{100}$, $HTHS_{100}$, $HTHS_{80}$) were measured and are summarized in Tables 4.

TABLE 4a

| | Formulation examples | | | | |
|---|---|---|---|---|---|
| | 1 | 2 | 3 | 4 | 5 |
| | | | polymer used | | |
| | Polymer A | Polymer B | Polymer C | Polymer D | Polymer E |
| Treat rate [%] | 6.6 | 6.2 | 6.5 | 6.8 | 7.0 |
| Solid content [%] | 1.9 | 1.8 | 1.9 | 2.0 | 2.0 |
| Yubase 4 [%] | 84.0 | 84.4 | 84.1 | 83.8 | 83.6 |
| DI package [%] | 8.9 | 8.9 | 8.9 | 8.9 | 8.9 |
| Polymer P | 0.5 | 0.5 | 0.5 | 0.5 | 0.5 |
| Solid content [%] | 0.3 | 0.3 | 0.3 | 0.3 | 0.3 |
| Total | 100 | 100 | 100 | 100 | 100 |
| | | | Analytical Data | | |
| $HTHS_{150}$ [mPas] | 2.60 | 2.55 | 2.60 | 2.60 | 2.60 |
| $HTHS_{100}$ [mPas] | 5.11 | 5.16 | 5.12 | 5.10 | 5.09 |
| $KV_{100}$ [mm²/s] | 8.14 | 8.52 | 8.37 | 8.36 | 8.27 |
| $KV_{40}$ [mm²/s] | 34.56 | 34.94 | 34.81 | 34.50 | 34.16 |
| VI | 221 | 234 | 229 | 232 | 231 |
| MRV@−40° C. [mPa*s] | 19,150 | 19,897 | 18,718 | 18,967 | 19,648 |
| Yield Stress [Pa] | Y ≤ 35 | Y ≤ 35 | Y ≤ 35 | Y ≤ 35 | Y ≤ 35 |
| Solubility test | clear | clear | clear | clear | clear |

TABLE 4b

| | Formulation examples (continued) | | | | |
|---|---|---|---|---|---|
| | 6 | 7 | 8 | 9 | 10*⁾ |
| | | | polymer used | | |
| | Polymer F | Polymer G | Polymer H | Polymer I | Polymer J*⁾ |
| Treat rate [%] | 6.6 | 6.7 | 6.5 | 6.6 | 6.4 |
| Solid content [%] | 1.9 | 1.09 | 1.9 | 1.9 | 1.9 |
| Yubase 4 [%] | 84.0 | 83.9 | 84.1 | 84.0 | 84.2 |

TABLE 4b-continued

Formulation examples (continued)

| | 6 | 7 | 8 | 9 | 10*) |
|---|---|---|---|---|---|
| | | | polymer used | | |
| | Polymer F | Polymer G | Polymer H | Polymer I | Polymer J*) |
| DI package [%] | 8.9 | 8.9 | 8.9 | 8.9 | 8.9 |
| Polymer P | 0.5 | 0.5 | 0.5 | 0.5 | 0.5 |
| Solid content [%] | 0.3 | 0.3 | 0.3 | 0.3 | 0.3 |
| Total | 100 | 100 | 100 | 100 | 100 |
| | | | Analytical Data | | |
| $HTHS_{150}$ [mPas] | 2.57 | 2.58 | 2.58 | 2.57 | 2.61 |
| $HTHS_{100}$ [mPas] | 5.05 | 5.07 | 5.10 | 5.17 | 5.34 |
| $KV_{100}$ [mm²/s] | 8.93 | 8.46 | 8.09 | 7.85 | 9.03 |
| $KV_{40}$ [mm²/s] | 35.39 | 34.48 | 33.89 | 33.50 | 38.64 |
| VI | 247 | 236 | 225 | 217 | 226 |
| MRV@−40° C. [mPa*s] | 19,145 | 18,770 | 18,423 | 18,437 | 30,584 |
| Yield Stress [Pa] | Y ≤ 35 | Y ≤ 35 | Y ≤ 35 | Y ≤ 35 | 35 < Y ≤ 70 |
| Solubility test | clear | clear | clear | clear | clear |

*)comparative example

TABLE 4c

Formulation examples (continued)

| | 11*) | 12*) | 13*) | 14*) | 15*) |
|---|---|---|---|---|---|
| | | | polymer used | | |
| | Polymer K*) | Polymer L*) | Polymer M*) | Polymer N*) | Polymer O*) |
| Treat rate [%] | 4.4 | 7.0 | 7.9 | 18.8 | 7.0 |
| Solid content [%] | 1.8 | 2.0 | 2.3 | 9.4 | 2.0 |
| Yubase 4 [%] | 86.2 | 83.6 | 82.7 | 71.8 | 83.6 |
| DI package [%] | 8.9 | 8.9 | 8.9 | 8.9 | 8.9 |
| Polymer P | 0.5 | 0.5 | 0.5 | 0.5 | 0.5 |
| Solid content [%] | 0.3 | 0.3 | 0.3 | 0.3 | 0.3 |
| Total | 100 | 100 | 100 | 100 | 100 |
| | | | Analytical Data | | |
| $HTHS_{150}$ [mPa*s] | 2.62 | insoluble | 2.58 | 2.60 | insoluble |
| $HTHS_{100}$ [mPa*s] | 5.44 | — | 5.32 | 5.73 | — |
| $KV_{100}$ [mm²/s] | 8.58 | — | 7.38 | 7.21 | — |
| $KV_{40}$ [mm²/s] | 38.89 | — | 32.82 | 35.71 | — |
| VI | 206 | — | 201 | 171 | — |
| MRV@−40° C. [mPa*s] | 39,260 | — | 20,735 | 21,198 | — |
| Yield Stress [Pa] | 140 < Y ≤ 175 | — | 70 < Y ≤ 105 | Y ≤ 35 | — |
| Solubility test | clear | insoluble | clear | clear | insoluble |

*)comparative example

Regarding yield stress: The results were considered as a pass if the apparent viscosity was ≤60,000 mPa s, and if the yield stress was <35 Pa.

Formulations 1 to 9 contain Polymers A to I and are in accordance with the present invention. They are all soluble in the 0W20 formulation and all show relatively low $HTHS_{100}$ values between 5.0 and 5.2 mPa*s. To the contrary, formulation examples 10 to 15, which contain Polymers J to P, are comparative examples and show significantly higher $HTHS_{100}$ values between 5.3 and 5.8 mPa*s.

Formulation examples 1 to 9 do further have $KV_{100}$ values in the range of 7.85 to 8.93 mm²/s and $KV_{40}$ values in the range of 33.50 to 35.39 mm²/s.

Formulation examples 12 and 15 are not soluble in the 0W20 formulation.

To show the influence of PPDs on final formulations, further formulation examples were prepared by using different PPDs with Yubase 4 as base oil and by using formulation targets of 0W20 according to SAE J300; i.e. it was formulated to an $HTHS_{150}$ target of 2.6 mPas by adding the polymers and PPDs as described in Table 2 above. As DI package was used the commercially available OLOA 55501. It was added for all examples in the usual amount of 8.9% by weight.

Characteristic EO formulation properties (KV100, HTHS100, HTHS80) were measured and are summarized in Table 5.

TABLE 5

Formulation examples with different PPDs.

| | 16 | 17*) | 18*) | 19*) |
|---|---|---|---|---|
| Polymer A [%] | 6.6 | 5.89 | 6.69 | 6.68 |
| Solid content [%] | 1.9 | 1.7 | 1.9 | 1.9 |

TABLE 5-continued

Formulation examples with different PPDs.

| | 16 | 17*) | 18*) | 19*) |
|---|---|---|---|---|
| Polymer P [%] | 0.5 | — | — | — |
| Solid content [%] | 0.3 | — | — | — |
| Polymer Q [%] | — | 0.5 | — | — |
| Solid content [%] | — | 0.3 | — | — |
| Polymer R [%] | — | — | 0.78 | — |
| Solid content [%] | — | — | 0.3 | — |
| Polymer S [%] | — | — | — | 0.48 |
| Solid content [%] | — | — | — | 0.3 |
| Yubase 4 [%] | 84.0 | 84.71 | 83.63 | 83.9 |
| DI package [%] | 8.9 | 8.9 | 8.9 | 8.9 |
| Total | 100 | 100 | 100 | 100 |
| Analytical Data | | | | |
| $HTHS_{150}$ [mPas] | 2.60 | 2.58 | 2.60 | 2.63 |
| $HTHS_{100}$ [mPas] | 5.11 | 5.15 | 5.16 | 5.22 |
| $KV_{100}$ [mm²/s] | 8.14 | 8.75 | 8.60 | 8.61 |
| $KV_{40}$ [mm²/s] | 34.56 | 36.38 | 35.35 | 35.30 |
| VI | 221 | 232 | 234 | 235 |
| MRV@−40° C. [mPa*s] | 19,150 | 19,320 | 23,019 | 22,228 |
| Yield Stress [Pa] | Y ≤ 35 | 35 < Y ≤ 70 | 35 < Y ≤ 70 | 35 < Y ≤ 70 |

*)comparative example

Regarding formulation example 16, Polymers A (VII) and Polymer P (PPD) are in accordance with the present invention; i.e. their composition, molecular weights and average carbon numbers are within the claimed ranges.

Regarding formulation examples 17 to 19, Polymers Q, R, S as PPD are not in accordance with the present invention; molecular weights and/or average carbon numbers is out of claimed ranges.

The formulation 16 show relatively low $HTHS_{100}$ values between 5.0 and 5.2 mPa*s and lower MRV than 60,000 mPa*s without yield stress. However, formulation examples 17 to 19 all failed yield stress.

The invention claimed is:

1. A lubricating oil composition, comprising:
   (A) 81.4% to 98.97% by weight of a base oil;
   (B) 1 to 3% by weight of a polyalkyl methacrylate based copolymer selected from the group consisting of:
   polymer 1, consisting of 25% by weight of methyl methacrylate (MMA), 5.0% by weight of butyl methacrylate (BMA), 0.1% by weight of isodecyl methacrylate (IDMA), 18.0% by weight of $C_{12-15}$-alkyl methacrylate having mass average carbon number 13.4 and linear alkyl group content 77% (DPMA), 31.9% by weight of lauryl methacrylate having mass average carbon number 12.5 and containing 73% $C_{12}$ and 27% $C_{14}$ all linear alkyl groups (LMA), and 20.0% by weight of stearyl methacrylate having mass average carbon number 17.1 and containing 6% $C_{14}$ with 30% $C_{16}$ and 64% $C_{18}$ all linear alkyl groups (SMA) and having a molar average carbon number of 7.2;
   polymer 2, consisting of 25% by weight of methyl methacrylate (MMA), 55.0% by weight of LMA and 20.0% by weight of SMA and having a molar average carbon number of 7.5;
   polymer 3, consisting of 25% by weight of methyl methacrylate (MMA), 2.5% by weight of butyl methacrylate (BMA), 18.0% by weight of DPMA, 34.5% by weight of LMA and 20.0% by weight of SMA and having a molar average carbon number of 7.4;
   polymer 4, consisting of 25% by weight of methyl methacrylate (MMA), 5.0% by weight of butyl methacrylate (BMA), 0.1% by weight of isodecyl methacrylate (IDMA), 18.0% by weight of DPMA, 29.4% by weight of LMA and 22.5% by weight of SMA and having a molar average carbon number of 7.3;
   polymer 5, consisting of 25% by weight of methyl methacrylate (MMA), 7.0% by weight of butyl methacrylate (BMA), 0.1% by weight of isodecyl methacrylate (IDMA), 18.0% by weight of DPMA, 27.4% by weight of LMA and 22.5% by weight of SMA and having a molar average carbon number of 7.1; and
   polymer 6, consisting of 25% by weight of methyl methacrylate (MMA), 5.0% by weight of butyl methacrylate (BMA), 0.1% by weight of isodecyl methacrylate (IDMA), 18.0% by weight of DPMA, 31.9% by weight of LMA and 20.0% by weight of SMA and having a molar average carbon number of 7.2,
   wherein the polyalkyl methacrylate based copolymer has a weight-average molecular weight $M_w$ of from 300,000 g/mol to 1,000,000 g/mol;
   (C) 0 to 0.3% by weight of a polyalkyl (meth)acrylate based copolymer, characterized by a molar average carbon number of 12.0 to 13.0 and a weight-average molecular weight $M_w$ of 10,000 to 100,000 g/mol; and
   (D) 0 to 15% by weight of one or more further additives,
   based on the total weight of the lubricating oil composition, wherein the average carbon number corresponds to the molar average of all carbon atoms present in an alkyl residue of an alkyl methacrylate forming the polyalkyl methacrylate based copolymer and the weight-average molecular weight $M_w$ is determined by gel permeation chromatography (GPC) using a polymethylmethacrylate calibration.

2. The lubricating oil composition according to claim 1, wherein component (D) is selected from the group consisting of conventional VI improvers, dispersants, defoamers, detergents, antioxidants, pour point depressants, antiwear additives, extreme pressure additives, friction modifiers, anticorrosion additives, dyes and mixtures thereof.

3. The lubricating oil composition of claim 1, wherein the polyalkyl methacrylate based copolymer has a number-average molecular weight $M_n$ in a range of 100,000 g/mol to 300,000 g/mol.

4. The lubricating oil composition of claim 1, wherein the polyalkyl methacrylate based copolymer has a number-average molecular weight $M_n$ in a range of 100,000 g/mol to 200,000 g/mol.

5. A method of keeping the $KV_{100}$ at a given $HTHS_{150}$ and in parallel decreasing the $HTHS_{100}$ of a lubricating oil composition, the method comprising:
   (a) adding an additive composition comprising a polyalkyl methacrylate based copolymer to a lubricating oil composition; and
   (b) keeping $KV_{100}$ and in parallel decreasing $HTHS_{100}$ of the lubricating oil composition,
   thereby obtaining the lubricating oil composition of claim 1.

6. The method according to claim 5, wherein the lubricating oil composition is an engine oil composition.

\* \* \* \* \*